(12) United States Patent
Choudhury et al.

(10) Patent No.: US 10,037,190 B2
(45) Date of Patent: Jul. 31, 2018

(54) TRANSFORMATION ON INPUT OPERANDS TO REDUCE HARDWARE OVERHEAD FOR IMPLEMENTING ADDITION

(71) Applicant: International Business Machines Corporation, Armonk, NY (US)

(72) Inventors: Mihir Choudhury, New York, NY (US); David J. Geiger, Poughkeepsie, NY (US); Ruchir Puri, Baldwin Place, NY (US); Andrew J. Sullivan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 15/079,850

(22) Filed: Mar. 24, 2016

(65) Prior Publication Data
US 2017/0277515 A1 Sep. 28, 2017

(51) Int. Cl.
*G06F 7/50* (2006.01)
*G06F 7/504* (2006.01)

(52) U.S. Cl.
CPC .................... *G06F 7/504* (2013.01)

(58) Field of Classification Search
CPC ..................................... G06F 7/504
USPC ....................................... 708/700
See application file for complete search history.

(56) References Cited

U.S. PATENT DOCUMENTS

| 5,537,330 | A | * | 7/1996 | Damiano | ............. G06F 17/505 |
| | | | | | 716/104 |
| 5,652,580 | A | | 7/1997 | Saxena | |
| 6,430,527 | B1 | | 8/2002 | Waters et al. | |
| 8,482,573 | B2 | | 7/2013 | Mallett | |

OTHER PUBLICATIONS

Kautz, "Testing for faults in combinational cellular logic arrays," IEEE Conference Record of the Eighth Annual Symposium on Switching and Automata Theory, 1967 (SWAT 1967), pp. 161-174 (Oct. 1967).
Howard, "Minimizing FIR Filter Designs Implemented in FPGAs Utilizing Minimized Adder Graph Techniques" Electronic Theses, Treatises and Dissertations, Paper 3725 (Dec. 2008) (85 pages).
Kravets et al., "Constructive library-aware synthesis using symmetries," Proceedings of the Design, Automation and Test in Europe Conference and Exhibition 200 (ACM 2000) (Mar. 2000) (6 pages).

(Continued)

*Primary Examiner* — Tan V. Mai
(74) *Attorney, Agent, or Firm* — Rabin Bhattachrya; Michael J. Chang, LLC

(57) ABSTRACT

Techniques for transforming input operands to reduce overhead for implementing addition operations in hardware are provided. In one aspect, a method for transforming input operands of an adder includes the steps of: receiving a bit array of the input operands; replacing a duplicate signal (e.g., a signal that occurs twice) for a given bit k in the bit array with a single signal at bit k+1; reducing a number of occurrences of the signal on adjacent bits of the input operand, wherein by way of the replacing and reducing a transformed bit array is formed; and providing the transformed bit array to the adder.

19 Claims, 6 Drawing Sheets

(56) References Cited

OTHER PUBLICATIONS

Gnamasekaran, "Performance of FIR Filter with Wallace Multiplier over FIR filter with Truncated Multiplier," IJCSEC—International Journal of Computer Science and Engineering Communications, vol. 2, Issue 3, pp. 450-455 (May 2014).
Brand, "Redundancy and Don't Cares in Logic Synthesis," IEEE Transactions on Computers, vol. C-32, issue 10, pp. 947-952 (Oct. 1983).
Cheng et al., "Multi-level logic optimization by redundancy addition and removal," Proceedings of the 4th European Conference on Design Automation 1993 with the European Event in ASIC design, pp. 373-377 (Feb. 1993).
Wallace, "A Suggestion for a Fast Multiplier," IEEE Transactions on Electronic Computer, vol. EC-13, issue 1, pp. 14-17 (Feb. 1964).
Dadda, "Some Schemes for Parallel Multipliers," Alta Frequenza 34: pp. 3490-356 (1965).

* cited by examiner

```
    a7 a6 a5 a4 a3 a2 a1 a0
  + b7 b6 b5 b4 b3 b2 b1 b0
  + c7 c6  z  z  z  z c1 c0
  + d7 d6 d5 d4 d3 d2 d1 d0
  + e7 e6 e5 e4 e3 e2 e1 e0
  ------------------------------
    s7 s6 s5 s4 s3 s2 s1 s0
```

Duplicate signal : Signal 'z' occurs in consecutive bit 2 – bit 5

Row transformation

Signal $z*(2^2 + 2^3 + 2^4 + 2^5) = z*(2^6 - 2^2)$

```
     0  z  0  0  0  0  0  0   ← z*2^6
  +  1  1  1  1  1  z' 1  1
  +  0  0  0  0  0  0  0  1    Twos
  + a7 a6 a5 a4 a3 a2 a1 a0    complement
  + b7 b6 b5 b4 b3 b2 b1 b0    of z*2^2
  + c7 c6  0  0  0  0 c1 c0
  + d7 d6 d5 d4 d3 d2 d1 d0
  + e7 e6 e5 e4 e3 e2 e1 e0
  ------------------------------
    s7 s6 s5 s4 s3 s2 s1 s0
```

Duplicate signal : Signal 'z'
occurs on bits 2,4,5,6

Row transformation

Signal $z*(2^2 + 2^4 + 2^5 + 2^6) = z*(2^7 - 2^3 - 2^2)$

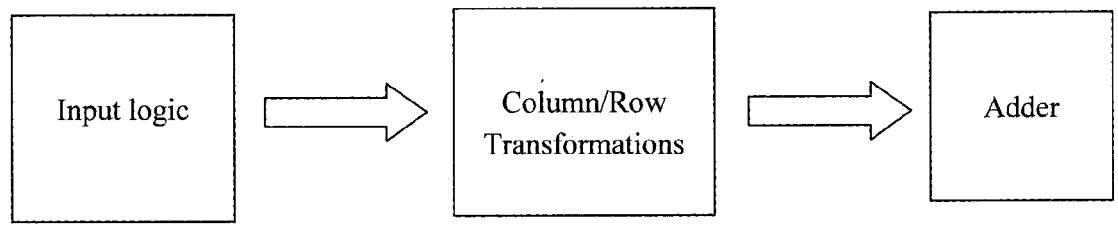
FIG. 6
FIG. 7
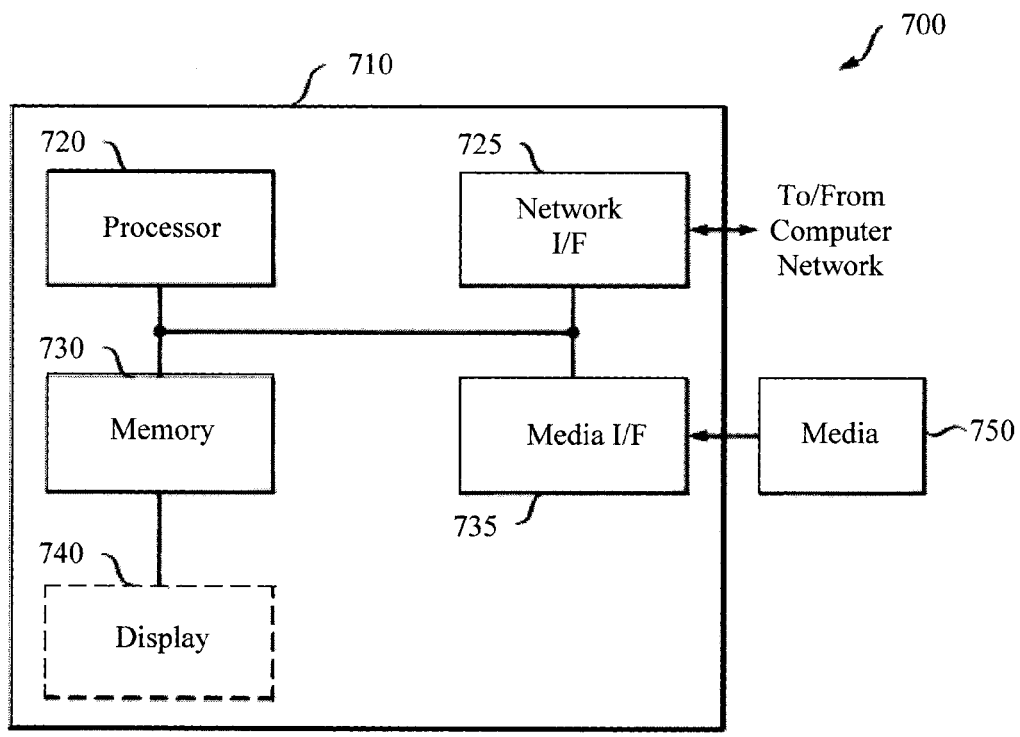

TRANSFORMATION ON INPUT OPERANDS TO REDUCE HARDWARE OVERHEAD FOR IMPLEMENTING ADDITION

FIELD OF THE INVENTION

The present invention relates to addition operations implemented in hardware, and more particularly, to techniques for transforming input operands to reduce overhead for implementing addition operations in hardware.

BACKGROUND OF THE INVENTION

Addition is by far the most frequently occurring operation in datapath logic of microprocessors. Implementing an addition operation in hardware can be challenging when there is signal multiplicity, i.e., when the same input signal occurs more than once in the input operands of the addition operation. Techniques for removing redundancy on a gate-level netlist has been proposed, for example, in Brand, "Redundancy and Don't Cares in Logic Synthesis," IEEE Transactions on Computers, vol. C-32, issue 10, pgs. 947-952 (October 1983) (hereinafter "Brand"), and in Cheng et al., "Multi-level logic optimization by redundancy addition and removal," Proceedings of the 4$^{th}$ European Conference on Design Automation 1993 with the European Event in ASIC design, pgs. 373-377 (February 1993). With these techniques the adder is expanded to a gate-level netlist followed by the application of redundancy removal techniques to eliminate signal redundancies, e.g., by deleting redundant connections. However, this approach has high runtime and generates a solution that can have tradeoffs in terms of power-delay.

Tree adders are probably the most popular structures, especially for implementing multi-operand adder in a multiplier. See, for example, Wallace, "A Suggestion for a Fast Multiplier," IEEE Transactions on Electronic Computer, vol. EC-13, issue 1, pgs. 14-17 (February 1964), and Dadda, "Some Schemes for Parallel Multipliers," Alta Frequenza 34: pgs. 3490-356 (1965). However, algorithmic tree adders do not have any mention of optimization for signal multiplicity in the input operands.

Therefore, improved techniques for addressing signal multiplicity in the input operands while implementing an addition operation in hardware would be desirable.

SUMMARY OF THE INVENTION

The present invention provides techniques for transforming input operands to reduce overhead for implementing addition operations in hardware. In one aspect of the invention, a method for simplifying input operands of an adder is provided. The method includes the steps of: receiving a bit array of the input operands; replacing a duplicate signal (e.g., a signal that occurs twice) for a given bit k in the bit array with a single signal at bit k+1; reducing a number of occurrences of the signal on adjacent bits of the input operand, wherein by way of the replacing and reducing a transformed bit array is formed; and providing the transformed bit array to the adder.

In another aspect of the invention, another method for transforming input operands of an adder is provided. The method includes the steps of: receiving a bit array of the input operands; replacing a duplicate signal (e.g., a signal that occurs twice) for a given bit k in the bit array with a single signal at bit k+1; repeating the replacing for one or more other bits in the array; replacing complementary signals at the given bit k in the array with a logic 1; reducing a number of occurrences of the signal on adjacent bits of the input operands by adding one or more additional rows to the array containing a fewer number of occurrences of the duplicate signal as compared to the bit array that is received, wherein by way of the replacing and reducing steps a transformed bit array is formed; and providing the transformed bit array to the adder.

A more complete understanding of the present invention, as well as further features and advantages of the present invention, will be obtained by reference to the following detailed description and drawings.

BRIEF DESCRIPTION OF THE DRAWINGS

FIG. 6 is a schematic diagram illustrating how the present transformation process can be implemented upon receipt of input operands at the adder according to an embodiment of the present invention; and FIG. 7 is a diagram illustrating an exemplary apparatus for performing one or more of the methodologies presented herein according to an embodiment of the present invention.

DETAILED DESCRIPTION OF PREFERRED EMBODIMENTS

As highlighted above, the present techniques address the problem of implementing addition operation in hardware when the same input signal occurs more than once as an input operand to the addition operation. More specifically, the present techniques describe two transformations for simplifying the input operands of an adder. As known in the art, an adder is a digital logic circuit that performs addition of numbers. Generally, an adder derives a sum (S) from a plurality of input signals (a, b, etc.). The transformations performed herein serve to reduce the number of duplicate (redundant) connections occurring in the input operands. These connections may also be referred to herein as 'nets' which is a common term used in conjunction with netlist technology, and generally represents any conductor that interconnects two or more component terminals.

By reducing the duplicate nets, the overall hardware cost (area logic/depth), i.e., overhead, for implementing an adder is reduced. Some advantages of the present approach are as follows: 1. the proposed approach provides an implementation with a lower hardware cost as compared to using redundancy removal techniques on a gate-level netlist (see above); and 2. existing techniques such as redundancy removal on a gate-level netlist can take several hours or even days to complete on adders with several hundred inputs, whereas the present approach takes only a few seconds.

In general, the present transformations are performed on the input operands of an adder by factoring duplicate entries in a column into an additional row, and factoring duplicate entries in a row into two additional rows. Namely, bit arrays are generally rectangular—defining multiple columns and rows. Each column in this case corresponds to a particular bit (e.g., bits 0, 1, 2, 3, 4, etc.) and each row corresponds to an input operand to the adder (e.g., input signals a, b, c, etc.). By way of the present techniques, a column transformation is performed wherein duplicate signals z (i.e., signals occurring more than once) at a given bit k are replaced with a single signal z at bit k+1, and/or complementary signals (e.g., z and z') at a given bit k are replaced with a logic 1. The complement of a signal z, i.e., z', is 0 when z=1 and is 1 when z=0.

Figure 1:
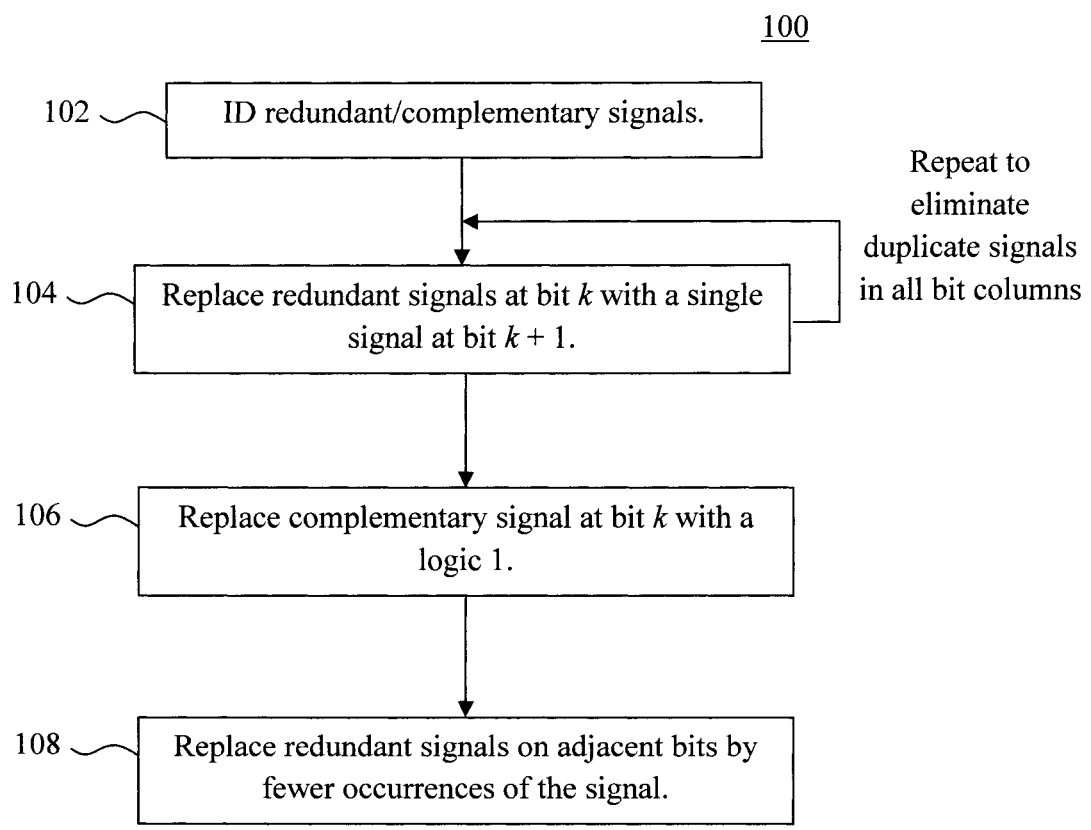
FIG. 1 is a diagram illustrating an exemplary methodology for simplifying input operands of an adder according to an embodiment of the present invention.

An overview of the present techniques is now provided by way of reference to methodology 100 of FIG. 1 for simplifying input operands of an adder bit array. In step 102, redundant and complementary signals in the bit array are identified. As provided above, redundant signals are duplicate input signals that occur more than once. In a netlist, an input signal is duplicated when it is connected to two or more input pins of an adder. Duplicate input signals are generally undesirable since they cause an unnecessary increase in network complexity.

Next, in step 104, for each redundant signal (identified in step 102) that occurs more than once for a given bit k in the array, the redundant signal is replaced with a single signal at bit k+1. As provided above, the bit array is configured into a plurality of columns and rows. Step 104 and step 106 (described below) are transformations performed on the bit columns. Thus, as shown in FIG. 1, step 104 is iterated to eliminate redundant signals in all of the bit columns. Step 108 (described below), on the other hand, involves transformations performed on the rows of adjacent bits.

In step 106, each complementary signal (identified in step 102) is replaced with a logic 1. For example, if complementary signals are identified at a given bit k, then these complementary signals are replaced in step 106 with a logic 1 at bit k.

In step 108, redundant signals on adjacent bits are replaced by fewer occurrences of the signal. As provided above, this is a row transformation process since it involves transformations on adjacent rows in the bit array. As will be described in detail below, the adjacent bits can be consecutive or non-consecutive bits in the array. Preferably, for improving design metrics, replacements are made only when fewer signals are added than removed. The present row transformation is especially useful in signed multipliers because sign extension can cause the same signal to occur on several adjacent bits.

It is notable that while methodology 100 is presented as a series of different steps, it is possible that certain steps might be combined and/or performed in an order different from that depicted and described, while still being within the confines of the present techniques. For instance, an example will be provided below where duplicate and complementary signals occur in the same bit column. In that example, the column transformations described in accordance with step 104 (duplicate signals) and step 106 (complementary signals) can be performed as a single column transformation that follows the replacement rules specified above for duplicate and complementary signals.

Figure 2:
FIG. 2 is a diagram illustrating the column transformation process for duplicate signals according to an embodiment of the present invention.

Given the above overview, the present techniques are now described in further detail by way of reference to FIGS. 2-6. FIG. 2 illustrates the column transformation process for duplicate signals. As provided above, column transformations are performed when there is a duplicate signal (a signal—referred to in this example as signal 'z'—that occurs more than once) at a bit k in the bit array. Referring to FIG. 2, the bit array prior to column transformation is shown on the top and the bit array after column transformation is shown on the bottom. The bits in the array are numbered (e.g., 0-7), and the sum (s) of the bits is provided below.

In the example depicted, the signal 'z' occurs 4 times at bit 2 (i.e., k=2). See circled occurrences of signal 'z' at bit 2. A column transformation is then performed (as per step 104 of methodology 100 above) to replace the redundant signal 'z' with a single signal 'z' at bit 4. As provided above, the replacement occurs at k+1. When a signal 'z' occurs two times at bit k, it is replaced by a single signal at bit k+1. In this example, the signal 'z' occurs 4 times at bit 2. So it will be replaced by 2 occurrences of signal 'z' at bit 3. Applying this transformation again at bit 3 the two occurrences of signal at bit 3 will be replaced by a single occurrence of signal 'z' at bit 4. The multiple occurrences of signal 'z' are now given a logic 0 at bit 2.

The bit arrays before and after column transformation are equivalent. See, for instance, the following example:

Adder 1

$$\begin{array}{r} a\ z \\ +b\ z \\ \hline s1\ s0 \end{array}$$

is equivalent to:

Adder 2

$$\begin{array}{r} a\ 0 \\ +b\ 0 \\ +z\ 0 \\ \hline s1\ s0 \end{array}$$

as follows:
The first operand of Adder 1 is: a z=a*2$^1$+z*2$^0$
The second operand of Adder 1 is: b z=b*2$^1$+z*2$^0$
Adding the two operands $$a^*2^1 + z^*2^0 + b^*2^1 + z^*2^0 = (a+b)^*2^1 + (z+z)^*2^0$$
$$= (a+b)^*2^1 + (2^*z)^*2^0$$
$$= (a+b)^*2^1 + z^*2^1$$
$$= (a+b+z)^*2^1 + (0+0+0)^*2^0$$

Which written in operand form looks like Adder 2.

While the present example only illustrates a single column having redundant signals, it is possible that redundant signals may be present in multiple bit columns. As provided above, the column transformation can be repeated to eliminate duplicate signals in all bit columns in the array.

Figure 3:
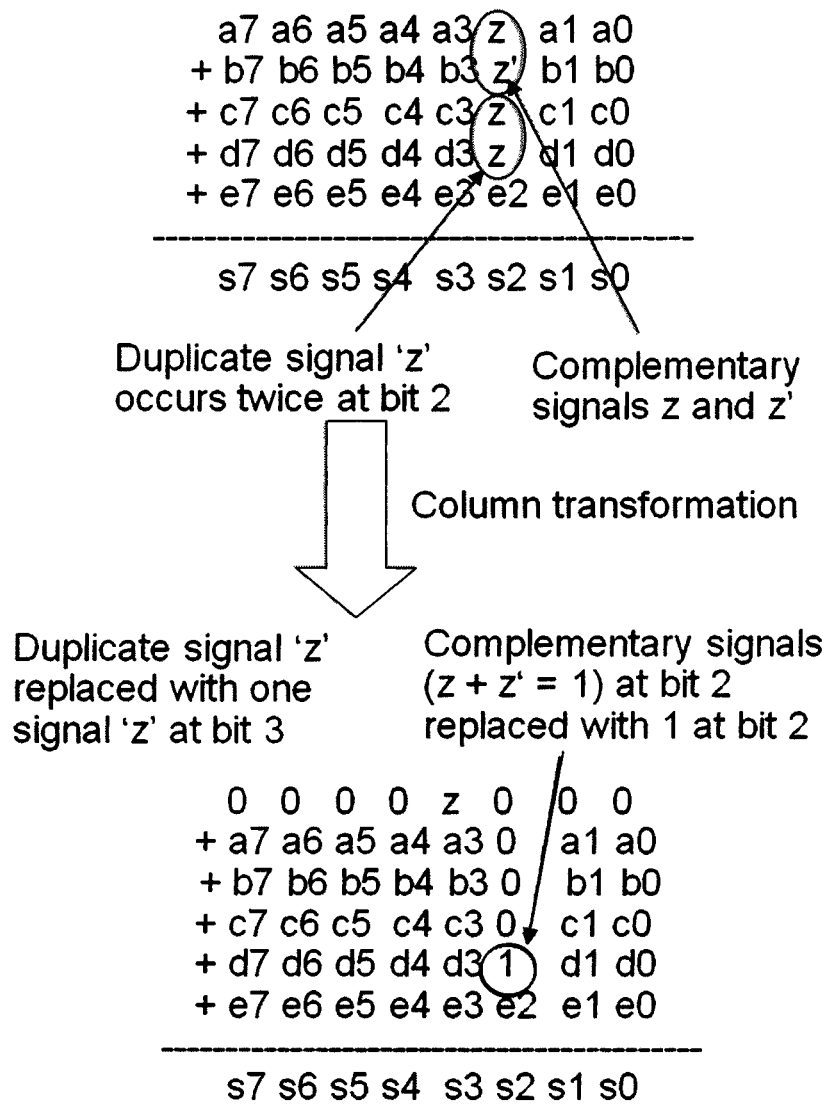
FIG. 3 is a diagram illustrating the column transformation process for duplicate and complementary signals according to an embodiment of the present invention.

FIG. 3 illustrates the column transformation process for complementary signals. As provided above, column transformations are also performed when there is a complementary signal z (z and z') at a bit k in the bit array. In the present example, occurrences of a duplicate signal and a complementary signal are shown to illustrate how these cases are both handled via the present column transformation process.

Referring to the array shown at the top in FIG. 3 (i.e., the array prior to column transformation) at bit 2 (i.e., k=2) there is both a duplicate signal z and a complementary signal z and z'.

Specifically, in the example depicted, the signal 'z' occurs 2 times at bit 2 (i.e., k=2), and the complementary signals z and z' occur once, also at bit 2. See circled occurrences of duplicate signal 'z' and complementary signals z and z' at bit 2. It is notable that the process would be the same if the duplicate and complementary signals occurred at different bits. Distinguishing between duplicate and complementary signals is made based on how the signals are connected to the input pins of an adder. In this example, the signal z will be connected to three input pins at bit 2 and connected once to bit 2 through an inverter (logic gate). Therefore, one can easily identify 3 z signals and 1 z' signal. Then two z signals at bit 2 would be replaced by 1 signal z at bit 3. And the remaining z and z' at bit 2 would be replaced by a constant 1 at bit 2. To use another example, if signal z occurs 3 times at bit 2 and there are no z' signals (complementary signal z) at bit 2, then two of those z signals are replaced by a signal z at bit 3. And one signal z will remain in bit 2. It does not matter which two z signals are replaced from bit 2 as they are all equivalent and will yield the right answer.

A column transformation is then performed (as per steps 104 and 106 of methodology 100 above) to i) replace the redundant signal 'z' with a single signal 'z' at bit 3 (i.e., the replacement occurs at k+1), and ii) to replace the complementary signals z and z' at bit 2 with a logic 1. See the array shown at the bottom in FIG. 3, i.e., the array after column transformation. The multiple occurrences of signal 'z' are now given a logic 0 at bit 2.

As provided above, the row transformation process can apply either in the case of duplicate signals occurring in consecutive bits (e.g., bits 1, 2, 3, etc.) or non-consecutive bits (e.g., bits 1, 2, 4, etc.). The first scenario, i.e., where duplicate signals occur in adjacent, consecutive bits, is now described by way of reference to FIG. 4.

Figure 4:
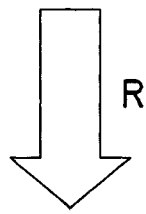
FIG. 4 is a diagram illustrating the row transformation process for duplicate signals occurring in consecutive bits according to an embodiment of the present invention.

Referring to the array shown at the top in FIG. 4 (i.e., the array prior to column transformation) a duplicate signal 'z' occurs 4 times in consecutive bits 2-5. See circled occurrences of duplicate signal 'z' at bits 2, 3, 4, and 5. As provided above, the goal of the row transformation process is to reduce the number of duplicate signals at adjacent bits. Thus, it is only desirable to do so if fewer signals can be added than are removed.

In this example, a row transformation is then performed (as per step 108 of methodology 100 above) to replace the redundant signal 'z' with a fewer number of occurrences. See the array shown at the bottom in FIG. 4, i.e., the array after column transformation. In this example, the duplicate signal in consecutive bits 2-5 has been replaced by 3 additional rows with fewer occurrences of signal 'z.' Thus, while duplicate occurrences of signal still exist, there are now only two occurrences (in bits 2 and 6) as opposed to the original 4 occurrences. Thus, the number of duplicate signals has been reduced via the present row transformation process. The example shown in FIG. 4 assumes a twos complement representation. A twos complement calculation allows subtraction to be expressed as an addition (i.e., in a twos complement representation, subtraction is the same as addition). For other representations (such as ones complement and signed magnitude), the row transformation process (i.e., replacing a sequence of the same signal occurring in consecutive or almost consecutive bits) remains the same. But, the twos complement computation will be replaced by a different calculation specific to that representation.

Equivalence in row transformation can be illustrated using the following example:

Adder 1

$$\begin{array}{c} a\ z\ z\ z \\ +b3\ b2\ b1\ b0 \\ \hline s3\ s2\ s1\ s0 \end{array}$$

The addition operation in Adder 1 can also be expressed as:

$$(a*2^3+z*2^2+z*2^1+z*2^0)+(b3*2^3+b2*2^2+b1*2^1+b0*2^0)$$

$$=(a*2^3 z*(2^2+2^1+2^0))+(b3*2^3+b2*2^2+b1*2^1+b0*2^0).$$

Since $(2^2+2^1+2^0)=(2^3-2^0)$, the addition can be rewritten as, $$=(a*2^3+z*(2^3-2^0))+(b3*2^3+b2*2^2+b1*2^1+b0*2^0)$$

$$=(a*2^3+0*2^2+0*2^1+0*2^0)+(b3*2^3+b2*2^2+b1*2^1+b0*2^0)+(z*2^3+0*2^2+0*2^1+0*2^0)-(0*2^3+0*2^2+0*2^1+z*2^0).$$

In twos complement representation, $$(0*2^3+0*2^2+0*2^1+z*2^0)=+(1*2^3+1*2^2+1*2^1+z'*2^0)$$

$$+(0*2^3+0*2^2+0*2^1+1*2^0)$$

Hence, the addition can be rewritten as:

$$=(a*2^3+0*2^2+0*2^1+0*2^0)+(b3*2^3+b2*2^2+b1*2^1+b0*2^0)+(z*2^3+0*2^2+0*2^1+0*2^0)-(0*2^3+0*2^2+0*2^1+z*2^0)++(1*2^3+1*2^2+1*2^1+z'*2^0)+(0*2^3+0*2^2+0*2^1+1*2^0)$$

In the operand form this becomes:

$$\begin{array}{c} z\ 0\ 0\ 0 \\ +0\ 0\ 0\ z' \\ +0\ 0\ 0\ 1 \\ +a\ 0\ 0\ 0 \\ +b3\ b2\ b1\ b0 \\ \hline s3\ s2\ s1\ s0 \end{array}$$

Figure 5:
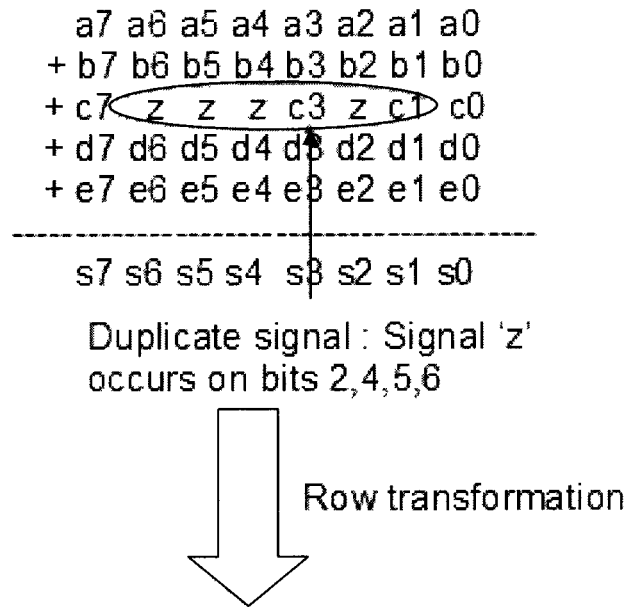
FIG. 5 is a diagram illustrating the row transformation process for duplicate signals occurring in non-consecutive bits according to an embodiment of the present invention.
Figure 5:
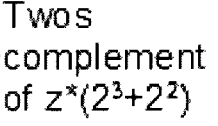

The same row transformation principles apply for duplicate signals occurring in non-consecutive bits. See, for example, FIG. 5. As shown in FIG. 5, in this case duplicate signal 'z' occurs 4 times in non-consecutive bits 2, 4, 5, and 6. See circled occurrences of duplicate signal 'z' at bits 2, 4, 5 and 6.

A row transformation is then performed (as per step 108 of methodology 100 above) to replace the redundant signal 'z' with a fewer number of occurrences. See the array shown at the bottom in FIG. 5, i.e., the array after column transformation. In this example, the duplicate signal 'z' in (non-consecutive) bits 2, 4, 5, and 6 has been replaced by 3 additional rows with fewer occurrences of signal 'z.' Thus, while duplicate occurrences of signal 'z' still exist, there are now only three occurrences (in bits 2, 3 and 7) as opposed to the original 4 occurrences. Thus, the number of duplicate signals has been reduced via the present row transformation process.

The present techniques may be implemented upon receipt of input operands at the adder. See FIG. 6. Namely, as shown in FIG. 6, upon receipt of input signals, the present column and row transformations can be performed (as per methodology 100) to reduce the number of duplicate signals as described above. A suitable apparatus for performing the transformations is described in accordance with the description of FIG. 7, below. The transformed input operands can then be processed by the adder.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Turning now to FIG. 7, a block diagram is shown of an apparatus 700 for implementing one or more of the methodologies presented herein. By way of example only, apparatus 700 can be configured to implement one or more of the steps of methodology 100 of FIG. 1.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for transforming input operands of an adder performed by a processor device, coupled to a memory, the processor device being implemented to perform the steps of:
   receiving a bit array of the input operands at the adder;
   replacing a duplicate signal for a given bit k in the bit array with a single signal at bit k+1, wherein the signal is duplicate when it is connected to two or more inputs of the adder;
   reducing a number of occurrences of the signal on adjacent bits of the input operand, wherein by way of the replacing and reducing a transformed bit array is formed; and
   providing the transformed bit array to the adder for processing.

2. The method of claim 1, further comprising the step of: identifying occurrences of the duplicate signal in the array.

3. The method of claim 1, further comprising the step of: identifying complementary signals in the array.

4. The method of claim 1, further comprising the step of: repeating the replacing for one or more other bits in the array.

5. The method of claim 1, further comprising the step of: replacing complementary signals at the given bit k in the array with a logic 1.

6. The method of claim 1, wherein the adjacent bits are consecutive bits in the array.

7. The method of claim 1, wherein the adjacent bits are non-consecutive bits in the array.

8. The method of claim 1, wherein the reducing step comprises the step of:
   adding one or more additional rows to the array containing a fewer number of occurrences of the duplicate signal as compared to the bit array that is received.

9. A method for transforming input operands of an adder performed by a processor device, coupled to a memory, the processor device being implemented to perform the steps of:
   receiving a bit array of the input operands at the adder;
   replacing a duplicate signal for a given bit k in the bit array with a single signal at bit k+1, wherein the signal is duplicate when it is connected to two or more inputs of the adder;
   repeating the replacing for one or more other bits in the array;
   replacing complementary signals at the given bit k in the array with a logic 1;
   reducing a number of occurrences of the signal on adjacent bits of the input operand by adding one or more additional rows to the array containing a fewer number of occurrences of the duplicate signal as compared to the bit array that is received,
   wherein by way of the replacing and reducing steps a transformed bit array is formed; and
   providing the transformed bit array to the adder for processing.

10. The method of claim 9, wherein the adjacent bits are consecutive bits in the array.

11. The method of claim 9, wherein the adjacent bits are non-consecutive bits in the array.

12. A computer program product for transforming input operands of an adder, the computer program product comprising a computer readable storage medium having program instructions embodied therewith, the program instructions executable by a computer to cause the computer to:
   receive a bit array of the input operands at the adder;
   replace a duplicate signal for a given bit k in the bit array with a single signal at bit k+1, wherein the signal is duplicate when it is connected to two or more inputs of the adder;
   reduce a number of occurrences of the signal on adjacent bits of the input operand,
   wherein by way of the replacing and reducing a transformed bit array is formed; and
   provide the transformed bit array to the adder for processing.

13. The computer program product of claim 12, wherein the program instructions further cause the computer to:
   identify occurrences of the duplicate signal in the array.

14. The computer program product of claim 12, wherein the program instructions further cause the computer to:
   identify complementary signals in the array.

15. The computer program product of claim 12, wherein the program instructions further cause the computer to:
   repeat the replacing for one or more other bits in the array.

16. The computer program product of claim 12, wherein the program instructions further cause the computer to:
   replace complementary signals at the given bit k in the array with a logic 1.

17. The computer program product of claim 12, wherein the adjacent bits are consecutive bits in the array.

18. The computer program product of claim 12, wherein the adjacent bits are non-consecutive bits in the array.

19. The computer program product of claim 12, wherein the program instructions when reducing the number of occurrences of the duplicate signal on the adjacent bits in the bit array further cause the computer to:
  add one or more additional rows to the array containing a fewer number of occurrences of the duplicate signal as compared to the bit array that is received.

\* \* \* \* \*